(12) United States Patent
Yamagishi

(10) Patent No.: US 9,294,790 B2
(45) Date of Patent: Mar. 22, 2016

(54) INFORMATION DISTRIBUTION DEVICE AND METHOD, AND INFORMATION DISTRIBUTION SYSTEM

(75) Inventor: Yasuaki Yamagishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 182 days.

(21) Appl. No.: 13/995,382

(22) PCT Filed: Jan. 10, 2012

(86) PCT No.: PCT/JP2012/050267
§ 371 (c)(1),
(2), (4) Date: Jun. 18, 2013

(87) PCT Pub. No.: WO2012/098950
PCT Pub. Date: Jul. 26, 2012

(65) Prior Publication Data
US 2013/0276049 A1      Oct. 17, 2013

(30) Foreign Application Priority Data

Jan. 17, 2011  (JP) ................................ 2011-007292

(51) Int. Cl.
*H04N 7/173* (2011.01)
*H04N 7/16* (2011.01)
(Continued)

(52) U.S. Cl.
CPC .......... *H04N 21/2385* (2013.01); *H04L 5/0005* (2013.01); *H04N 21/2402* (2013.01); *H04N 21/64738* (2013.01)

(58) Field of Classification Search
CPC ..... G06Q 30/06; G06Q 50/188; G06Q 30/02; G06Q 30/0243; G06Q 30/0247; G06Q 30/0249; G06Q 30/0283; H04N 21/2385; H04N 21/2402; H04N 21/64738; H04W 16/14; H04L 5/0005

USPC .................................................... 705/37, 80
See application file for complete search history.

(56) References Cited

U.S. PATENT DOCUMENTS 8,873,524 B2 * 10/2014 Henry ........................... 370/338
2003/0126594 A1 * 7/2003 Tsuria et al. .................. 725/25
(Continued)

OTHER PUBLICATIONS

Spectrum Bridge, Inc., Spectrum Bridge 802.19 TV White Spce Working Group, 2010.*
(Continued)

*Primary Examiner* — Benjamin R Bruckart
*Assistant Examiner* — Jen-Shi Huang
(74) *Attorney, Agent, or Firm* — Oblon, McClelland, Maier & Neustadt, L.L.P.

(57) ABSTRACT

[Object] To improve efficiency of information distribution.
[Solution] A broadcast resource management server 12 obtains frequency usage state information from WSDBs 21-1 through 21-N when content to be distributed is provided, evaluates, based on the obtained frequency usage state information a distribution time slot to distribute content and a distribution frequency band to use for the distribution, notifies TVBDs 31-1 through 31-M of a distribution schedule so as to be in state capable of reception of the content to be distributed using the distribution frequency band in a distribution time slot, and the broadcast server 11 uses, when a distribution time slot arrives, the distribution frequency band to distribute the content to the TVBDs 31-1 through 31-M in a receivable state in accordance with the distribution schedule. The present invention can be applied to a content distribution system to perform distribution of the content.

15 Claims, 15 Drawing Sheets

(51) Int. Cl.
*H04N 21/2385* (2011.01)
*H04N 21/24* (2011.01)
*H04N 21/647* (2011.01)
*H04L 5/00* (2006.01)

(56) References Cited

U.S. PATENT DOCUMENTS

2006/0031082 A1* 2/2006 Amaitis et al. .................. 705/1
2007/0073583 A1* 3/2007 Grouf et al. .................... 705/14
2009/0144801 A1* 6/2009 Grouf et al. ...................... 726/1
2010/0232504 A1* 9/2010 Feng ........................ 375/240.13
2010/0309806 A1* 12/2010 Wu et al. ....................... 370/252
2011/0096770 A1* 4/2011 Henry ........................... 370/352
2015/0043527 A1* 2/2015 Henry ........................... 370/330

OTHER PUBLICATIONS

"Development Road Map of Attention Technology and Its Possibility" (with Translation), Aug. 2009, 9 pages.

* cited by examiner

INFORMATION DISTRIBUTION DEVICE AND METHOD, AND INFORMATION DISTRIBUTION SYSTEM

TECHNICAL FIELD

The present invention relates to an information distribution device and method, and an information distribution system, and particularly relates to an information distribution device and method, and an information distribution system to improve efficiency of information distribution.

BACKGROUND ART

In recent years, development of information communication means has led to a service which uses various information communication means and distributes information such as content coming into widespread use. Due to the influence thereof, traffic amount of data communication has been increasing, and there is demand for means to handle this increasing traffic.

As one of the means, a technique has been proposed which is referred to as cognitive wireless communication, and which enables effective use of frequency by a terminal device and a base station recognizing the wireless environment and dynamically switching the communication system and frequency being used. With this cognitive wireless communication, practical implementation is being advanced for a frequency sharing system which uses frequencies allocated to existing wireless systems with a different wireless system.

For example, a frequency band which is allocated to an existing wireless system but is not used in that area or of which usage time is limited, may be used with a different wireless system. In particular, in the U.S.A., practical implementation thereof has been advanced as a technique to utilize available channels of TV broadcasting, which is so-called TV white space (for example, see NPL 1).

In NPL 1, a system is described in which a database (white space database: WSDB (White Space Data Base)) in which is registered available frequency and time slot for each area, is established, and wireless devices (TVBD (TV Band Devices)) refer to whether or not the frequency can be used, based on the current position.

CITATION LIST

Non Patent Literature

NPL 1: Koji Fujii, "Core technology of application of White Space to reduce radio waste" [online], business network.jp, [search Dec. 13, 2010], Internet <URL: http://businessnetwork.jp/tabid/65/artid/110/page/2/Default.aspx>

SUMMARY OF INVENTION

Technical Problem

Incidentally, broadcasting media, of which TV broadcasting is representative, has a function of global broadcasting as distribution characteristic, however, there is a need for the number of terminal devices receiving globally broadcast data at the same time to be greatest, to make the most of this distribution characteristic.

To improve the capability of this global broadcasting receiving, the number of terminal devices activated at the same time should be the greatest, however, with the conventional techniques, there is a limit to the number of terminal devices activated at the same time, so improving the function of global broadcasting receiving has been difficult. Accordingly, the distribution property of the broadcasting media called global broadcasting function is far from having been fully utilized, and this has been a cause of inefficient information distribution.

The present invention has been made in the light of this situation, so as to enable to improve the efficiency of information distribution.

Solution to Problem

An aspect of the present invention is an information distribution device including: content obtaining means to obtain content to be distributed; frequency usage state information obtaining means to obtain frequency usage state information relating to usage state of a frequency band for each time slot in each predetermined area; distribution evaluation means to evaluate a distribution time slot to distribute the obtained content and a distribution frequency band to be used for the distribution, based on the obtained frequency usage state information; distribution information notifying means to notify the distribution information for the content to be distributed using the distribution frequency band for the distribution time slot, as to multiple terminal devices within the areas; and content distribution means to use, when the distribution time slot arrives, the distribution frequency band to distribute the obtained content to multiple terminal devices in a state capable of being distributed to, in accordance with the distribution information.

The information distribution device further includes: evaluation reference information obtaining means to obtain evaluation reference information which is a reference when evaluating the distribution time slot and distribution frequency band, wherein the distribution evaluation means evaluates the distribution time slot and distribution frequency band, based on the obtained evaluation reference information.

With the information distribution device, the evaluation reference information is a reference to highly evaluate the cost of a time slot where viewing of the content by even more viewers is expected, and to highly evaluate the cost of a frequency band where an even higher distribution bit rate of the content is expected.

With the information distribution device, the evaluation reference information is a reference to highly evaluate the cost of a time slot where viewing of the content by even more viewers is expected.

With the information distribution device, the evaluation reference information is a reference to highly evaluate the cost of a frequency band where an even higher distribution bit rate of the content is expected.

With the information distribution device, the frequency usage state information obtaining means obtain the frequency usage state information of each area from an information management device managing the frequency usage state information of each area.

With the information distribution device, the information distribution device is configured of a distribution device and a management device, and wherein the distribution device includes the content obtaining means and the content distribution means, and wherein the management device includes the frequency usage state information obtaining means, distribution evaluation means, and distribution information notifying means.

An aspect of the present invention is an information distribution method, including the steps of: an information distribution device obtaining content to be distributed; obtaining frequency usage state information relating to an usage state of a frequency band for each time slot in each predetermined area; evaluating a distribution time slot to distribute the obtained content and a distribution frequency band to use to the distribution, based on the obtained frequency usage state information; notifying distribution information for the content to be distributed, using the distribution frequency band for the distribution time slot, as to multiple terminal devices within the areas; and distributing, when the distribution time slot arrives, the obtained content, to multiple terminal devices in a state capable of being distributed to in accordance with the distribution information, using the distribution frequency band.

With an information distribution device and method, obtains content to be distributed; frequency usage state information relating to a usage state of a frequency band for each time slot in predetermined each area is obtained; a distribution time slot to distribute the obtained content and a distribution frequency band to be used for the distribution are evaluated based on the obtained frequency band usage state information; distribution information of the content to be distributed using the distribution frequency band for the distribution time slot, is notified as to multiple terminal devices within the areas; and when a distribution time slot arrives, the obtained content is distributed to multiple terminal devices in a state capable of being distributed to in accordance with the distribution information using the distribution frequency band.

An information distribution system according to an aspect of the present invention is an information distribution system configured of an information distribution device, an information management device, and multiple devices, the information distribution device including: content obtaining means to obtain content to be distributed, frequency usage state information obtaining means to obtain the frequency usage state information, from the information management device managing frequency usage state information relating to usage state of a frequency band for each time slot in each predetermined area, distribution evaluation means to evaluate a distribution time slot to distribute the obtained content and a distribution frequency band to be used for the distribution, based on the obtained frequency usage state information, and distribution information notifying means to notify the distribution information of the content to be distributed, using the distribution frequency band for the distribution time slot, as to the plurality of terminal devices within the areas; each of the terminal devices including control means to control the content to be distributed, using the distribution frequency band in a receivable state for the distribution time slot, based on the distribution information notified from the information distribution device, when the distribution time slot arrives; the information distribution device further including content distribution means to distribute the obtained content, using the distribution frequency band to a plurality of terminal devices in a state capable of being distributed to in accordance with the distribution information, when the distribution time slot arrives; and each of the terminal devices further including reception means to receive the content to be distributed from the information distribution device.

With an information distribution system according to the present invention, content to be distributed is obtained by an information distribution device; frequency usage state information is obtained from an information managing device managing frequency usage state information relating to a usage state of a frequency band each time slot in predetermined each area; a distribution time slot to distribute the obtained content and a distribution frequency band to be used for the distribution are evaluated based on the obtained frequency usage state information; distribution information is notified as to multiple terminal devices within the area regarding the content to be distributed using the distribution frequency band for the distribution time slot; content to be distributed using a distribution frequency band is controlled by each of the terminal devices so as to be in a receivable state in a distribution time slot, based on distribution information notified from the information distribution device, and further when a distribution time slot has arrived, and the obtained content is distributed by the information distribution device to multiple terminal devices which are in a state capable of being distributed to in accordance with distribution information using the distribution frequency band; and content distributed from the information distribution device is received by each of the terminal devices.

Advantageous Effects of Invention

According to the present invention, efficiency of information distribution can be improved.

DESCRIPTION OF EMBODIMENTS

Hereinafter, description will be made regarding embodiments according to the present invention. Note that the description will be made in the following order.

1. First Embodiment
2. Second Embodiment
3. Third Embodiment
4. Modification

<1. First Embodiment>
[Configuration of Content Distribution System]

Figure 1:
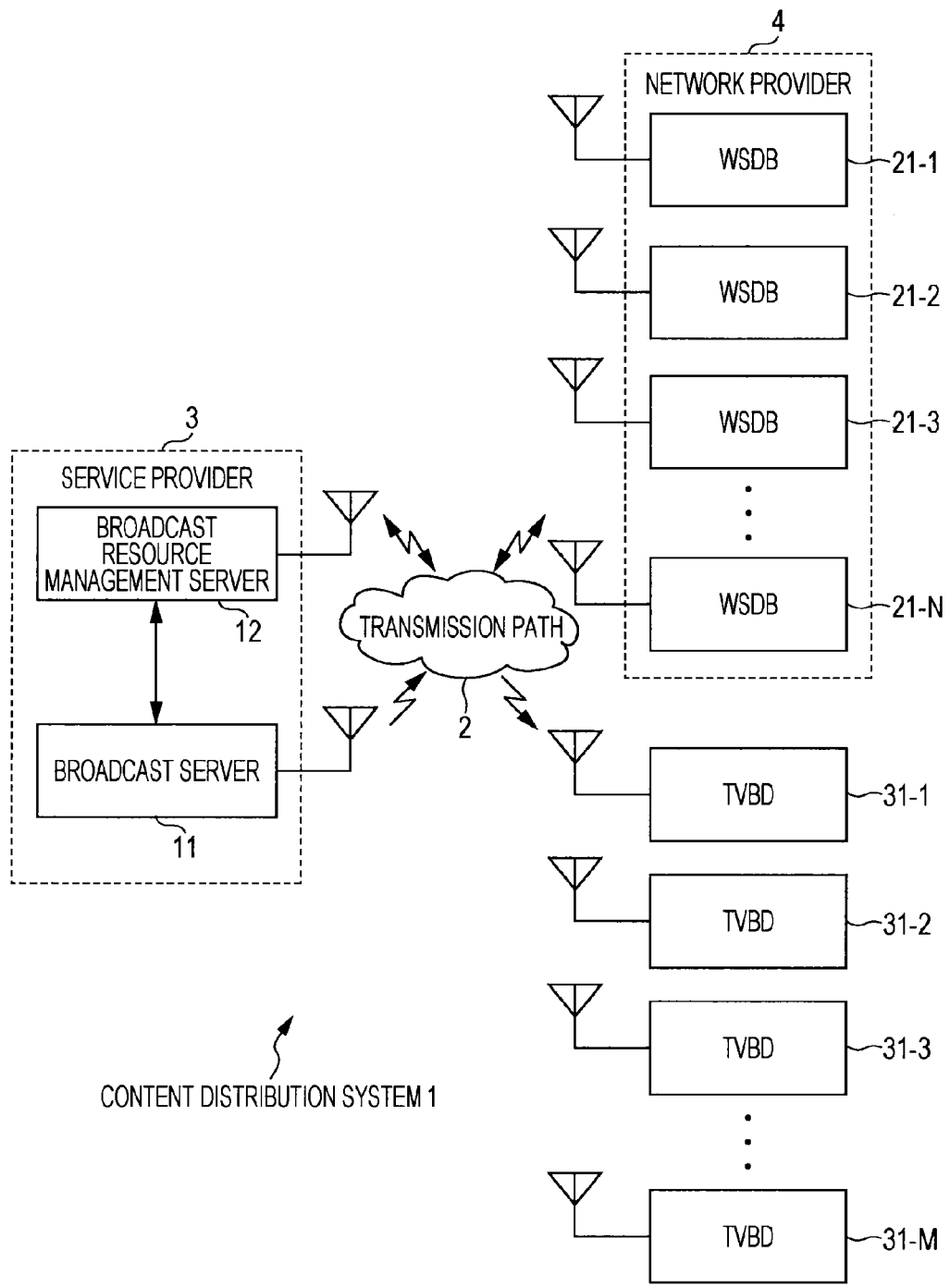
FIG. 1 is a diagram illustrating a configuration of an embodiment of a content distribution system according to the present invention.

FIG. 1 is a diagram illustrating the configuration of an embodiment of a content distribution system according to the present invention.

A content distribution system 1 is configured of a broadcast server 11, a broadcast resource management server 12, WSDBs 21-1 through 21-N, and a TVBDs 31-1 through 31-M.

The broadcast server 11 is a dedicated server to perform distribution of the content. The broadcast server 11 is located within equipment of a service provider 3. The service provider 3 is a provider to provide distribution service of content such as TV programs and movies.

The broadcast server 11 obtains content to be distributed, and requests a distribution schedule of the content to the broadcast resource management server 12.

The broadcast resource management server 12 is a dedicated server to manage distribution of content. The broadcast resource management server 12 is located within equipment of the service provider 3. The broadcast server 11 and the broadcast resource management server 12 are, for example, located within the same equipment and exchanges various types of data by performing cable or wireless communication by a predetermined communication system.

In accordance with the request from the broadcast server 11, the broadcast resource management server 12 inquires a usage state of the frequency band for each time slot, to the WSDBs 21-1 through 21-N via a transmission path 2.

The WSDBs 21-1 through 21-N (N: 1, 2, 3, . . . , N) are dedicated servers to manage information regarding the usage state of the frequency band each time slot in each area (hereinafter, referred to as frequency usage state information), by a white space database (WSDB: White Space Data Base). The WSDBs 21-1 through 21-N are located within equipment of the network provider 4. The network provider 4 is a provider to provide the frequency usage state information.

In accordance with the request from the broadcast resource management server 12, the WSDBs 21-1 through 21-N notify the frequency usage state information to the broadcast resource management server 12 via the transmission path 2.

The broadcast resource management server 12 determines the distribution schedule of the content, based on the frequency usage state information notified from the WSDBs 21-1 through 21-N, and notifies this to the broadcast server 11. Also, the broadcast resource management server 12 notifies the distribution schedule of the content to the TVBDs 31-1 through 31-M via the transmission path 2.

The broadcast server 11 performs broadcast distribution on the content to the TVBDs 31-1 through 31-M via the transmission path 2, based on the distribution schedule notified from the broadcast resource management server 12.

The TVBDs 31-1 through 31-M (M: 1, 2, 3, . . . , M) are dedicated terminal devices to execute playing or storing of the distributed content, referred to as a TV band device (TVBD: TV Band Devices). For example, the TVBDs 31-1 through 31-M are used to be held by users or located in user homes, or the like.

The TVBDs 31-1 through 31-M perform preparation for receiving distribution of the content, based on the distribution schedule notified from the broadcast resource management server 12, and thus are in a state where the content is receivable. In the event that the content is distributed from the broadcast server 11, the TVBDs 31-1 through 31-M receive the content thereof and plays or stores this.

The content distribution system 1 in FIG. 1 is thus configured.

Note that, in the following description, in the event that there is no need to distinguish between the WSDBs 21-1 through 21-N particularly, these will be referred to as a WSDB 21 and described. Also, in the event that there is no need to distinguish between the TVBDs 31-1 through 31-M in particular, these will be referred to as TVBD 31 and described.

[Configuration of Each Device]

Next, description will be made in detail regarding each of the broadcast server 11, broadcast resource management server 12, WSDB 21, and TVBD 31 making up the content distribution system 1 in FIG. 1, with reference to FIG. 2 through FIG. 5.

[Configuration of Broadcast Server]

Figure 2:
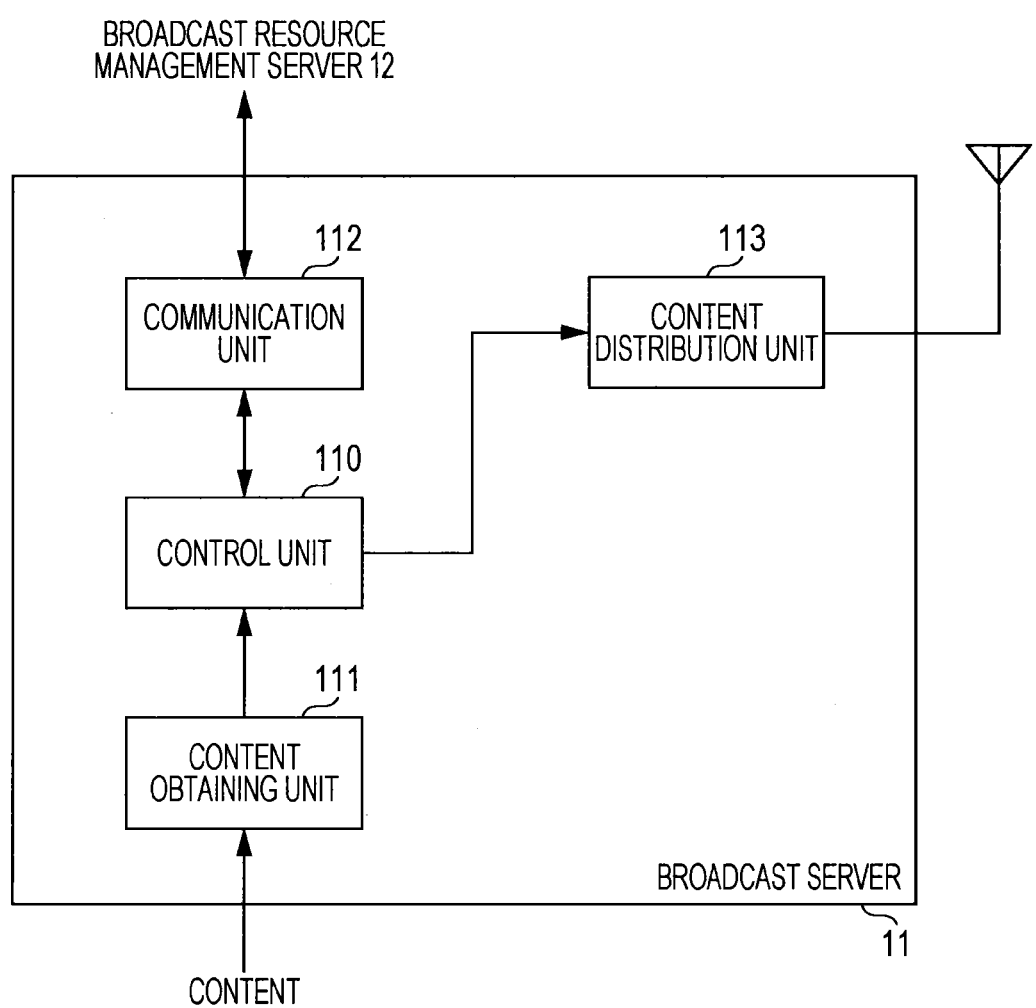
FIG. 2 is a diagram illustrating a configuration example of a broadcast server.

FIG. 2 is a diagram illustrating a configuration example of the broadcast server 11 in FIG. 1.

The broadcast server 11 is configured of a control unit 110, a content acquisition unit 111, a communication unit 112, and a content distribution unit 113.

The control unit 110 controls operation of each unit of the broadcast server 11.

The content acquisition unit 111 obtains the content which performs broadcast distribution to the TVBD 31, and supplies this to the control unit 110.

In the event that the content is supplied from the content acquisition unit 111, the control unit 110 supplies to the communication unit 112 the request of the distribution schedule regarding the content.

The communication unit 112 transmits the request of the distribution schedule supplied from the control unit 110 to the broadcast resource management server 12. The communication unit 112 receives the distribution schedule transmitted from the broadcast resource management server 12, and supplies this to the control unit 110, in accordance with the distribution schedule request.

The control unit 110 executes scheduling of the distribution processing, based on the distribution schedule supplied from the communication unit 112. Upon a time slot to distribute the content having arrived, the control unit 110 supplies the content which has acquired by the content acquisition unit 111 to the content distribution unit 113.

The content distribution unit 113 performs broadcast distribution to the TVBDs 31-1 through 31-M via the transmission path 2 the content supplied from the control unit 110, using the frequency band to distribute the content thereof.

The broadcast server 11 is thus configured.

[Configuration of Broadcast Resource Management Server]

Figure 3:
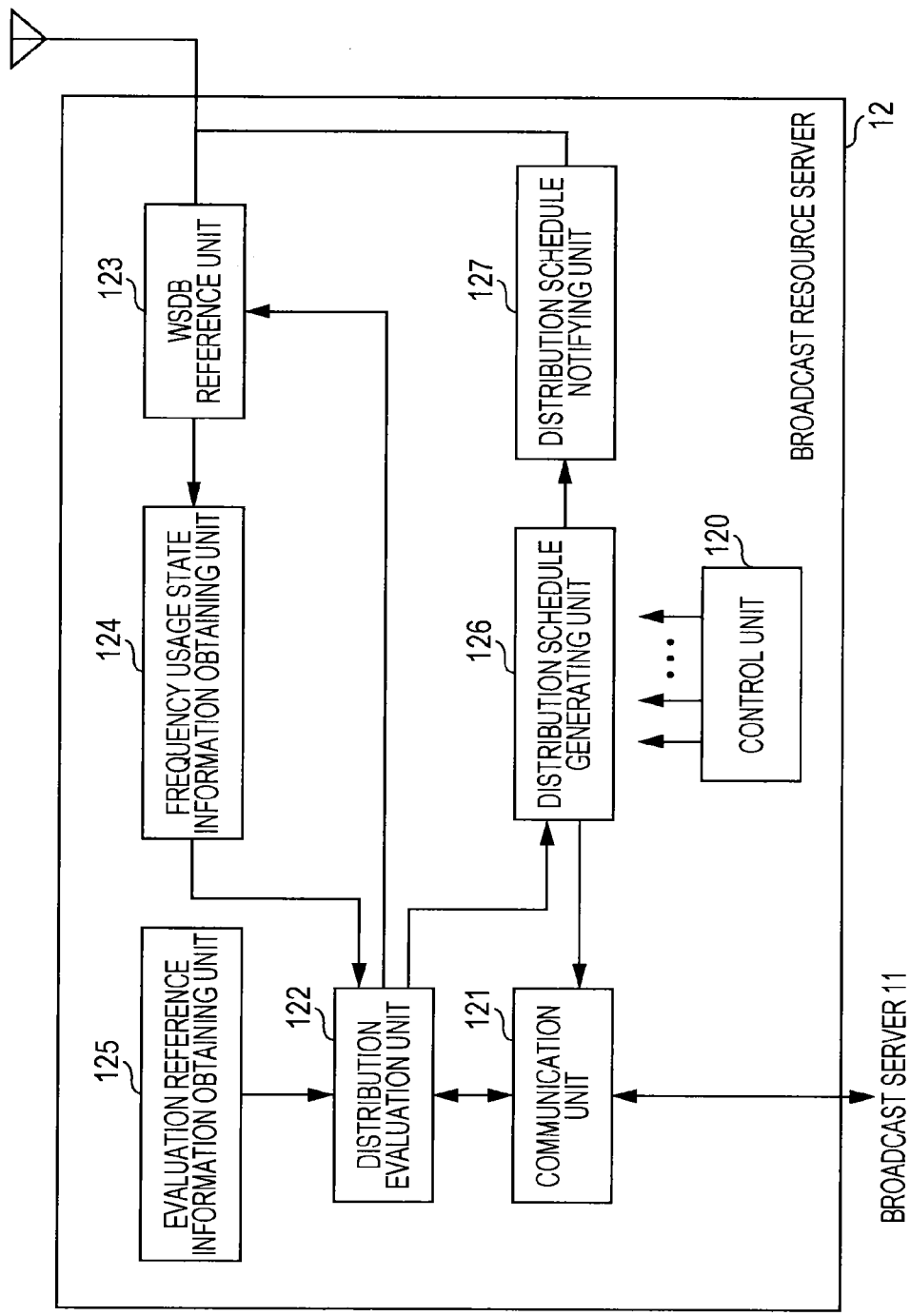
FIG. 3 is a diagram illustrating a configuration example of a broadcast resource management server.

FIG. 3 is a diagram illustrating a configuration example of the broadcast resource management server 12 in FIG. 1.

The broadcast resource management server 12 is configured of a control unit 120, a communication unit 121, a distribution evaluation unit 122, a WSDB reference unit 123, a frequency usage state information obtaining unit 124, an evaluation reference information obtaining unit 125, a distribution schedule generating unit 126, and a distribution schedule notifying unit 127.

The control unit 120 controls each operation of the broadcast resource management server 12.

The communication unit 121 receives the distribution schedule request transmitted from the broadcast server 11, and supplies this to the distribution evaluation unit 122.

In the event that the request of the distribution schedule from the communication unit 121 is supplied, the distribution evaluation unit 122 instructs reference of the WSDB 21 to the WSDB reference unit 123.

In accordance with the instruction from the distribution evaluation unit 122, the WSDB reference unit 123 inquiries the frequency usage state information to the WSDBs 21-1 through 21-N via the transmission path 2. In accordance with the inquiry, the WSDB reference unit 123 supplies the frequency usage state information notified from each of the WSDBs 21-1 through 21-N to the frequency usage state information obtaining unit 124.

The frequency usage state information obtaining unit 124 obtains the frequency usage state information supplied from the WSDB reference unit 123, and supplies this to the distribution evaluation unit 122.

The evaluation reference information obtaining unit 125 obtains evaluation reference information, and supplies this to the distribution evaluation unit 122.

The evaluation reference information is information which is a basis for evaluation at the time of the distribution evaluation unit 122 executing distribution evaluating processing, and for example, is set beforehand by content production companies, broadcasting stations, an individual, and other content providers who provide content to be distributed. The evaluation reference information may be held by the broadcast resource management server 12, or may be obtained at the same time with the content to be distributed.

The frequency usage state information from the frequency usage state information obtaining unit 124 and evaluation reference information from the evaluation reference information obtaining unit 125, in addition to the distribution schedule request supplied from the communication unit 121, are supplied to the distribution evaluation unit 122.

The distribution evaluation unit 122 executes distribution evaluating processing to evaluate a time slot to distribute the content where the distribution schedule has been requested (hereinafter, referred to as a distribution time slot) and a frequency band to be utilized to the distribution (hereinafter, referred to as a distribution frequency band), based on the frequency usage state information and evaluation reference information. The distribution evaluation unit 122 supplies the result of the distribution evaluation obtained by the distribution evaluating processing to the WSDB reference unit 123 and distribution schedule generating unit 126.

The WSDB reference unit 123 notifies of information to reserve the distribution time slot and distribution frequency band as a reserved block to the WSDBs 21-1 through 21-N via the transmission path 2, based on the result of the distribution evaluation supplied from the distribution evaluation unit 122. Also, in the event that distribution of the content has ended, the WSDB reference unit 123 notifies information to release the reserved block to the WSDBs 21-1 through 21-N via the transmission path 2.

The distribution schedule generating unit 126 generates the distribution schedule, based on the result of the distribution evaluation supplied from the distribution evaluation unit 122, and supplies this to the communication unit 121 and distribution schedule notifying unit 127.

The communication unit 121 transmits the distribution schedule supplied from the distribution schedule generating unit 126 to the broadcast server 11.

The distribution schedule notifying unit 127 notifies of the distribution schedule supplied from the distribution schedule generating unit 126 to the TVBDs 31-1 through 31-M.

The broadcast resource management server 12 is thus configured.

[Configuration of WSDB]

Figure 4:
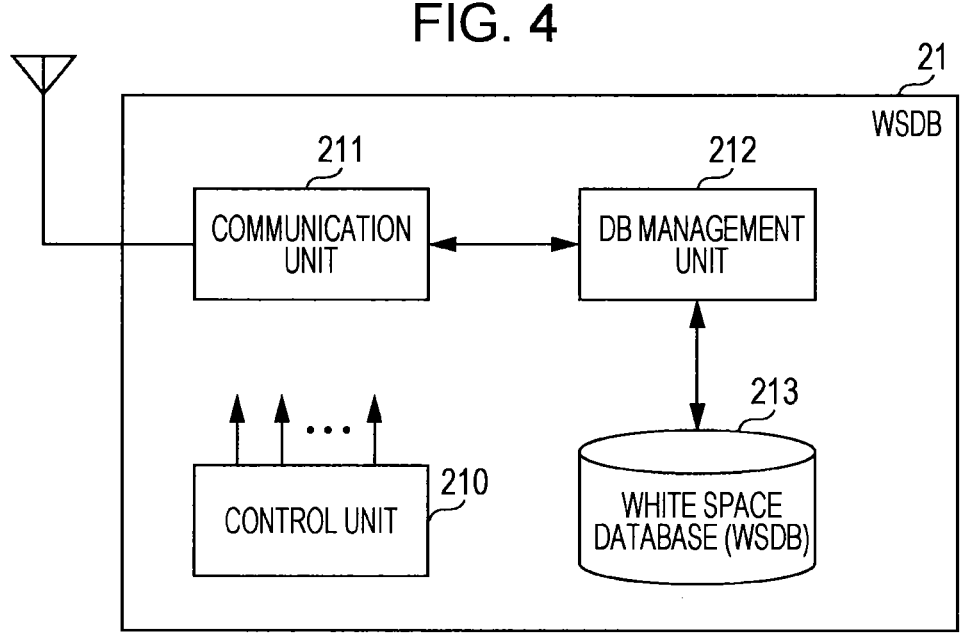
FIG. 4 is a diagram illustrating a configuration example of a WSDB.

FIG. 4 is a diagram illustrating a configuration example of the WSDB 21 in FIG. 1.

The WSDB 21 is configured of a control unit 210, a communication unit 211, DB management unit 212, and a WSDB 213.

The control unit 210 controls each operation of the components of the WSDB 21. The control unit 210 controls the communication unit 211 and DB management unit 212, collects information relating to a frequency and a time slot to be used in a predetermined area under its management so as to register this to the WSDB (White Space Data Base) 213.

The communication unit 211 receives an inquiry of the frequency usage state information notified via the transmission path 2, from the broadcast resource management server 12, and supplies this to the DB management unit 212.

In accordance with the inquiry supplied from the communication unit 211, the DB management unit 212 refers to the WSDB 213 and obtains the frequency usage state information. The DB management unit 212 supplies the frequency usage state information to the communication unit 211.

The communication unit 211 notifies of the frequency usage state information supplied from the DB management unit 212 to the broadcast resource management server 12 via the transmission path 2.

Also, in the event that a reserved block or releasing of the reserved block thereof is notified from the broadcast resource management server 12, the communication unit 211 supplies the notification to the DB management unit 212.

In accordance with the notification supplied from the communication unit 211, the DB management unit 212 refers to the WSDB 213, and registers the reserved block, or executes processing to release the reserved block.

The WSDB 21 is thus configured.

[Configuration of TVBD]

Figure 5:
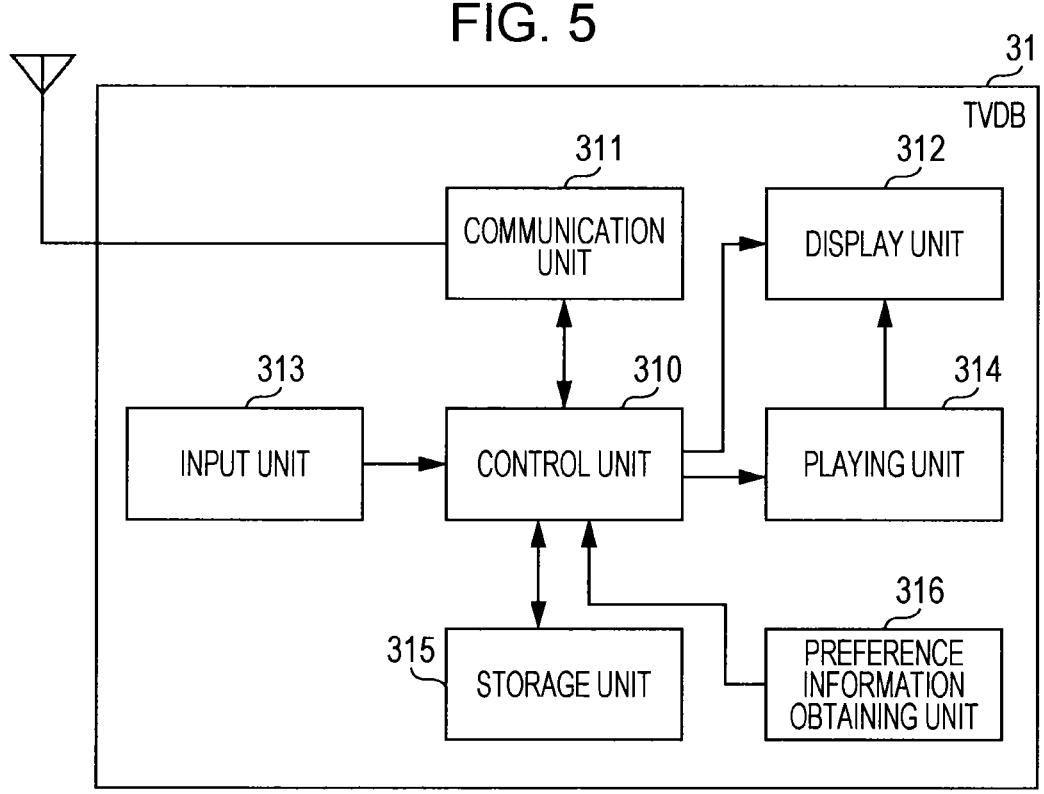
FIG. 5 is a diagram illustrating a configuration example of a TVBD.

FIG. 5 is a diagram illustrating a configuration example of the TVBD 31 in FIG. 1.

The TVBD 31 is configured of a control unit 310, a communication unit 311, a display unit 312, an input unit 313, a playing unit 314, a storage unit 315, and a preference information acquiring unit 316.

The control unit 310 controls each operation of the TVBD 31.

The communication unit 311 receives the distribution schedule notified via the transmission path 2 from the broadcast resource management unit 12, and supplies this to the control unit 310.

The control unit 310 executes scheduling of the reception processing, based on the distribution schedule supplied from the communication unit 311. The control unit 310 displays the result of the scheduling to the display unit 312.

The control unit 310 selects, of content regarding which distribution is planned, desired content, based on the operation signal from the input unit 313. Also, the control unit 310 selects desired content, based on the preference information obtained by the preference information acquiring unit 316.

The preference information is a user's history of viewing and so forth, for example, and it may be held by the TVBD 31 itself, or it may be obtained from an external device, before selection processing of the desired content will be executed.

The control unit 310 activates the TVBD 31 and controls the desired content in the state where the desired content is receivable, immediately before the distribution time slot of the desired content arrives.

The communication unit 311 receives the content which is performed broadcast distribution via the transmission path 2 from the broadcast server 11, and supplies this to the control unit 310.

In the event of playing the content supplied from the communication unit 311, the control unit 310 supplies the content to the playing unit 314. In this case, the playing unit 314 plays the content supplied from the control unit 310 in real time so as to be displayed in the display unit 312. Also, in the event that the content supplied from the communication unit 311 is stored, the control unit 310 supplies the content to the storage unit 315 and stores. In this case, the stored content is played by the playing unit 314.

The TVBD 31 is thus configured.

[Content Distribution Processing]

Figure 6:
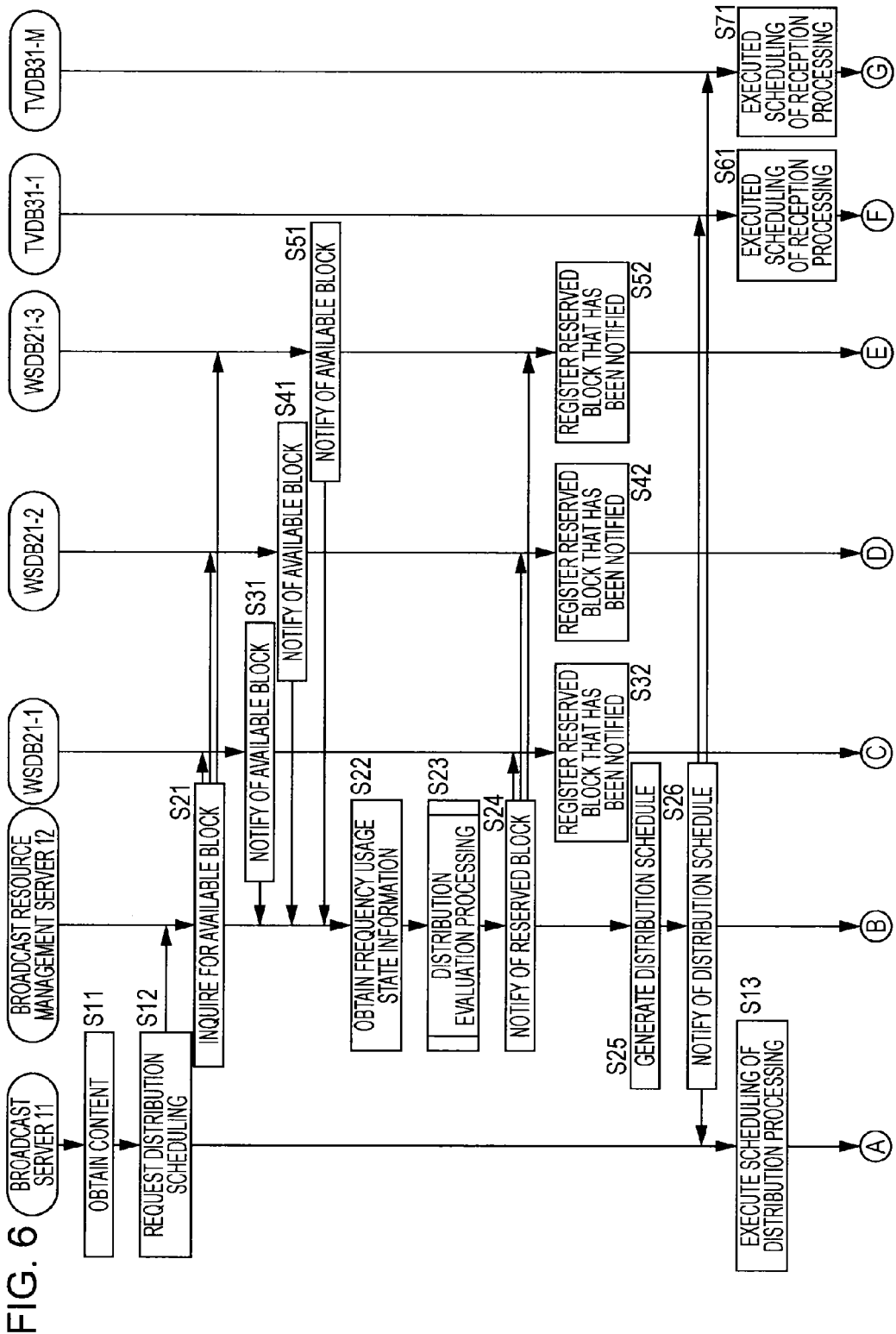
FIG. 6 is a flowchart illustrating content distribution processing.

Next, description will be made regarding content distribution processing executed in the content distribution system 1 in FIG. 1, with reference to FIG. 6 and FIG. 7.

Note that, here, to simplify the description, we will assume that the TVBDs 31-1 through 31-M exist in the area under management of the WSDBs 21-1 through 21-3 and description will be made, representing, of the TVBDs 31-1 through 31-M, the TVBD 31-1 and TVBD 31-M.

With the broadcast server 11, upon the content being obtained by the content obtaining unit 111 (step S11), the control unit 110 requests the distribution schedule to the broadcast resource management server 12 (step S12).

Note that, the content obtained by the content obtaining unit 111 is provided from content production companies, broadcasting stations, an individual, and other content providers, via a terminal device or recording medium.

In the broadcast resource management server 12, upon the distribution schedule being requested from the broadcast server 11, available blocks in the time slots and frequency band areas are inquired to the WSDBs 21-1 through 21-3, respectively, via the transmission path 2 by the WSDB reference unit 123 (step S21).

In step S31, the DB management unit 212 of the WSDB 21-1 refers to the WSDB 213, identifies the available block from the usage state each time slot in the area where it manages, and notifies of the frequency usage state information in accordance with the available block thereof to the broadcast resource management server 12. In the same way as with the WSDB 21-1 and WSDB 21-3, the available blocks for each area are identified and the frequency usage state information is notified to the broadcast resource management server 12 (steps S41 and S51).

In the broadcast resource management server 12, the frequency usage state information from the WSDB 21-1 through WSDB 21-3 is obtained by the frequency usage state information obtaining unit 124 (step S22). In step S23, the distribution evaluation unit 122 then, executes distribution evaluating processing, based on the frequency usage state information obtained by the frequency usage state information obtaining unit 124.

Figure 8:
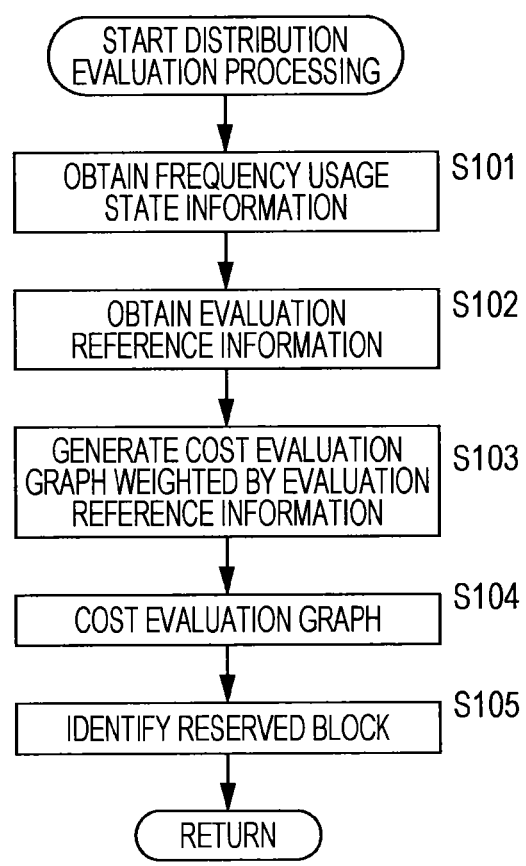
FIG. 8 is a flowchart illustrating details of distribution evaluation processing.
Figure 9:
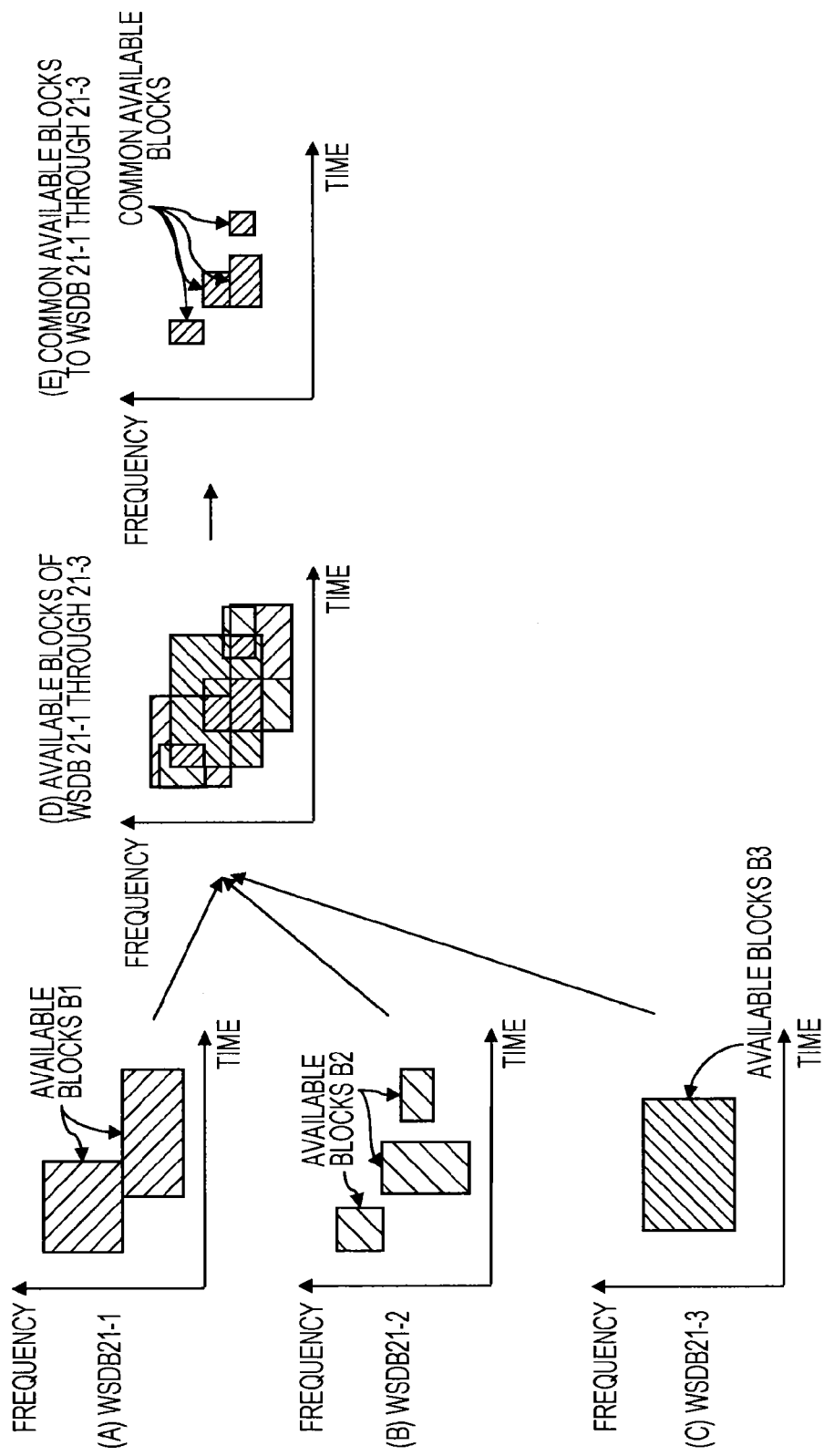
FIG. 9 is a diagram illustrating an identifying method of a common available block.

Here, description will be made in detail regarding distribution evaluating processing corresponding to step S23 in FIG. 6, with reference to the flowchart in FIG. 8.

The distribution evaluation unit 122 obtains the frequency usage state information obtained by the frequency usage state information obtaining unit 124 and evaluation reference information obtained by the evaluation reference information obtaining unit 125 (steps S101 and S102).

In step S103, the distribution evaluation unit 122 generates a cost evaluation graph weighted by the evaluation reference information, based on the obtained frequency usage state information and evaluation reference information. The distribution evaluation unit 122 evaluates the generated cost evaluation graph (step S104) and identifies the reserved block, in accordance with the result of the distribution evaluation (step S105).

Here, description will be made in detail regarding an evaluation method of the cost evaluation graph, with reference to FIG. 9 through FIG. 12.

As illustrated in FIG. 9A through 9C, representing each of the available blocks B1 through B3 notified by the frequency usage state information obtained from the WSDBs 21-1 through 21-3 on the plane with time and frequency, regions made up of the time slot and frequency band identified by the available blocks B, are different for each WSDB 21. The reason is because, as described above, the regions regarding which the usage state of the time slots and frequency bands are being managed for each WSDB 21 are different, so the available time slots and frequency bands are different in each of the regions.

Representing the planes illustrated in FIG. 9A through FIG. 9C on a plane in a superimposed manner, as illustrated in FIG. 9D, includes either the region where all the available blocks B1 though B3 are overlapped, the region where the available blocks B1 and B2 are overlapped, the region where the available blocks B1 and B3 are overlapped, the region where the available blocks B2 and B3 are overlapped, and the region which is made up of the available regions B1, B2, and B3 only. The region where all the available blocks B1 though B3 are overlapped are selected, as illustrated in FIG. 9E, and four common available blocks are obtained. These common available blocks are a commonly available frequency band in a common time slot, in all the areas under management of the WSDBs 21-1 through 21-3.

That is to say, the broadcast server 11 can perform broadcasting distribution of the content, by using the distribution frequency band corresponding to the distribution time slot in the distribution time slot within the region of the common available blocks illustrated in FIG. 9E. This content to be subjected to broadcasting distribution is then distributed to the TVBDs 31-1 through 31-M existing in the area under management of the WSDBs 21-1 through 21-3.

Also, at the time of evaluating the time slot and frequency band within the common available blocks, weighting is performed to the region of the available blocks and then evaluation can be executed. For example, regarding the region which is expected the content to be viewed by many viewers such as the time slot between 19:00 to 22:00 on Sundays, the usage cost of the available blocks is set high and on the other hand, regarding the region which is expected that the viewers become less such as early in the morning or late at night, the usage cost of the available blocks is set low.

For example, as illustrated in FIG. 10A through 10C, regarding the available blocks B1 through B3 in FIG. 9A through FIG. 9C can be set, for each WSDB 21, as to a region where more viewing by many more viewers can be expected and the usage cost is high (hereinafter, referred to as high-cost-per-time region), on the graphs each represented on planes of time and frequency.

When the planes illustrated in FIG. 10A through FIG. 10C are then represented on a plane in a superimposed manner, as illustrated in FIG. 10D, a high-cost-per-time region is further superimposed to the available blocks B1 through B3 represented in a superimposed manner. That is to say, of the regions of the common available blocks, with the common available block within the high-cost-per-time region, the cost is expected to be high, while, with the common available block in the region where the usage cost which is out of the highcost-per-time region is lower (hereinafter, referred to as low-cost-per-time region), the cost is expected to be low.

In the evaluation reference information is included a cost parameter indicating which of the common available blocks which belongs to the high-cost-per-time region or low-cost-per-time region has priority.

For example, in the event that the cost parameter indicates the priority of the low-cost-per-time region, as illustrated in FIG. 10E, the common available block within the low-cost-per-time region is selected as a reserved block. Note that while a case where the low-cost-per-time region has priority has been illustrated in FIG. 10E, in the event that the cost parameter indicates that the high-cost-per time region has priority, the common available block within the high-cost-per-time region is selected as a reserved block.

Also, the usage cost of the available block may be set in accordance with rise and fall of the bit rates which distributes content, i.e., cost of frequency band, besides a time slot such as the date and time or point-in-time.

For example, as illustrated in FIG. 11A through 11C, a region where the distribution bit rate to distribute the content is expected to be high and the usage cost is high (hereinafter, referred to as a high-cost-per-frequency region), can be set for a graph representing the available blocks B1 through B3 on a plane of time and frequency, for each WSDB 21.

When the plane illustrated in FIG. 11A through FIG. 11C represented on a plane in a superimposed manner, as illustrated in FIG. 11D, the high-cost-per-frequency region is further superimposed to the available blocks B1 through B3 represented in a superimposed manner. That is to say, of the available blocks, the cost is expected to be high with the common available block within the high-cost-per-frequency region, while the cost is expected to be low with the common available block outside of the high-cost-per-frequency region where the usage cost is low (hereinafter, referred to as low-cost-per-frequency region).

A parameter indicating which of the common available blocks belonging to the high-cost-per-frequency region or low-cost-per-frequency region has priority, is included in the evaluation reference information, as a cost parameter, besides the parameter relating to the priority of the above-described time cost region.

For example, in the event that the cost parameter indicates the priority of the low-cost-per-frequency region, as illustrated in FIG. 11E, the common available block within the low-cost-per-frequency region is selected as a reserved block. Note that in FIG. 11E is illustrated the case where the low-cost-per-frequency region has priority, however, in the event that the cost parameter is indicating the priority of the high-cost-per-frequency region, the common available block within the high-cost-per-frequency region is selected as a reserved block.

Figure 10:
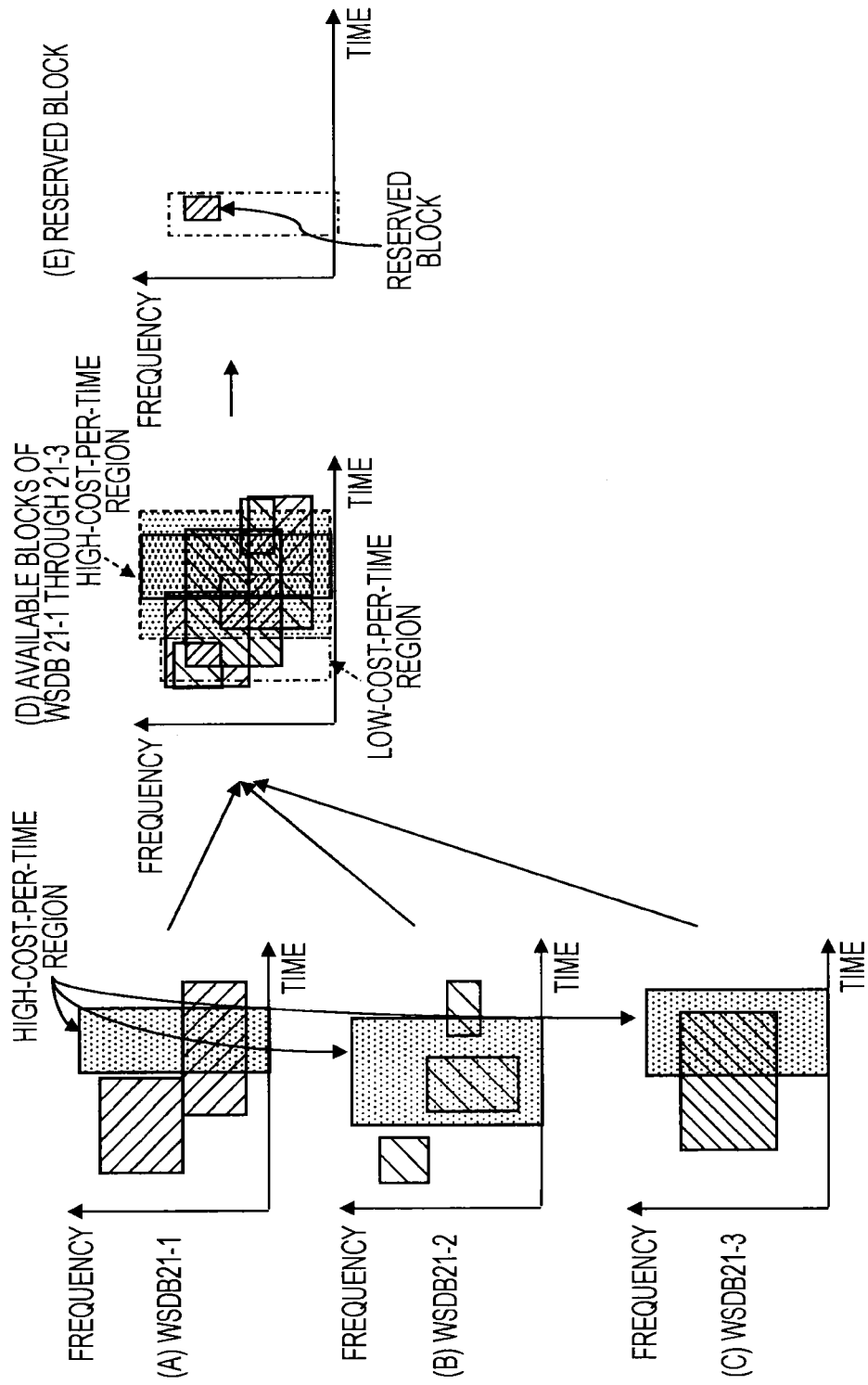
FIG. 10 is a diagram illustrating an evaluation method of a cost evaluation graph (setting low-cost-per-time).
Figure 11:
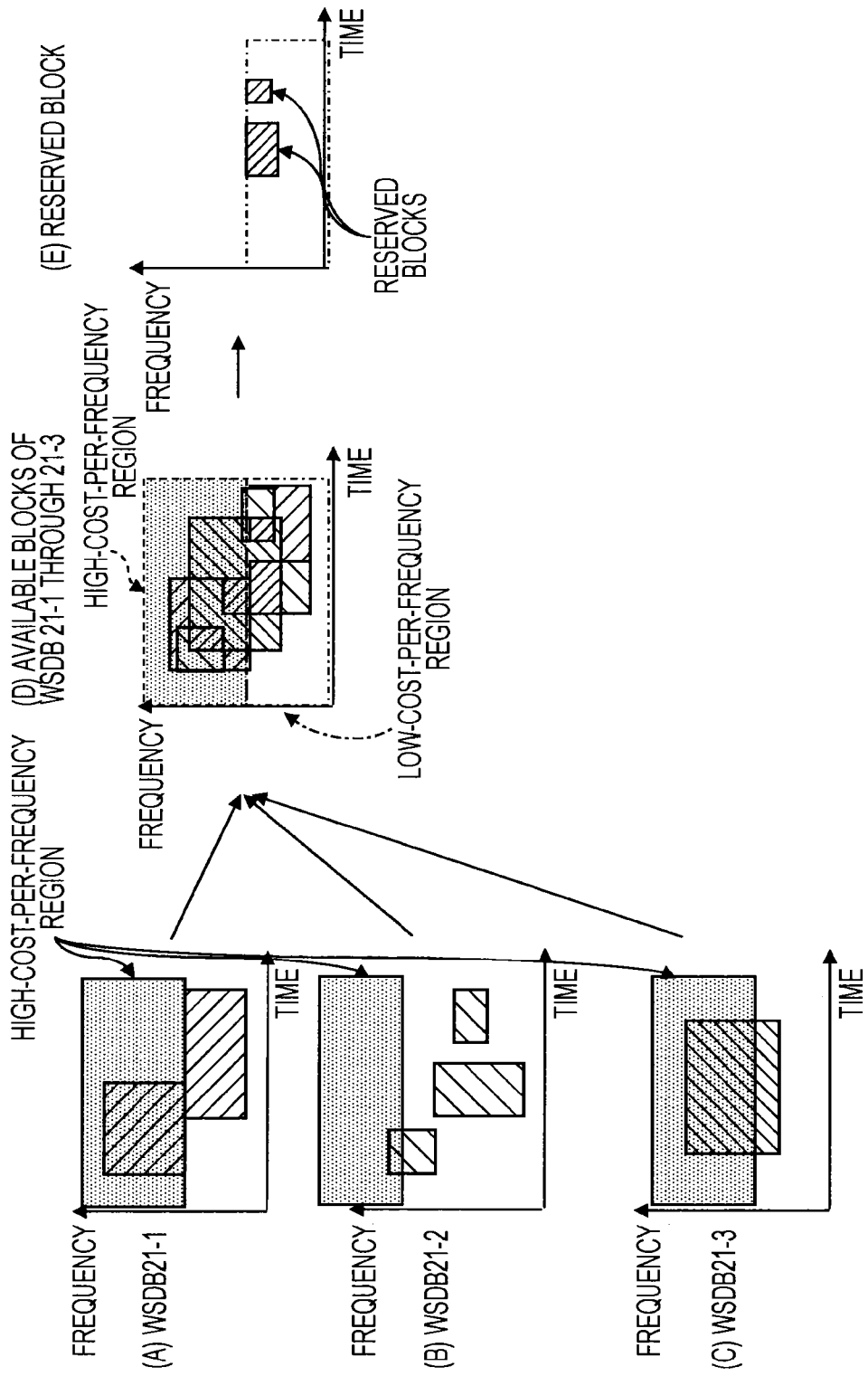
FIG. 11 is a diagram illustrating an evaluation method of a cost evaluation graph (setting low-cost-per-frequency).
Figure 12:
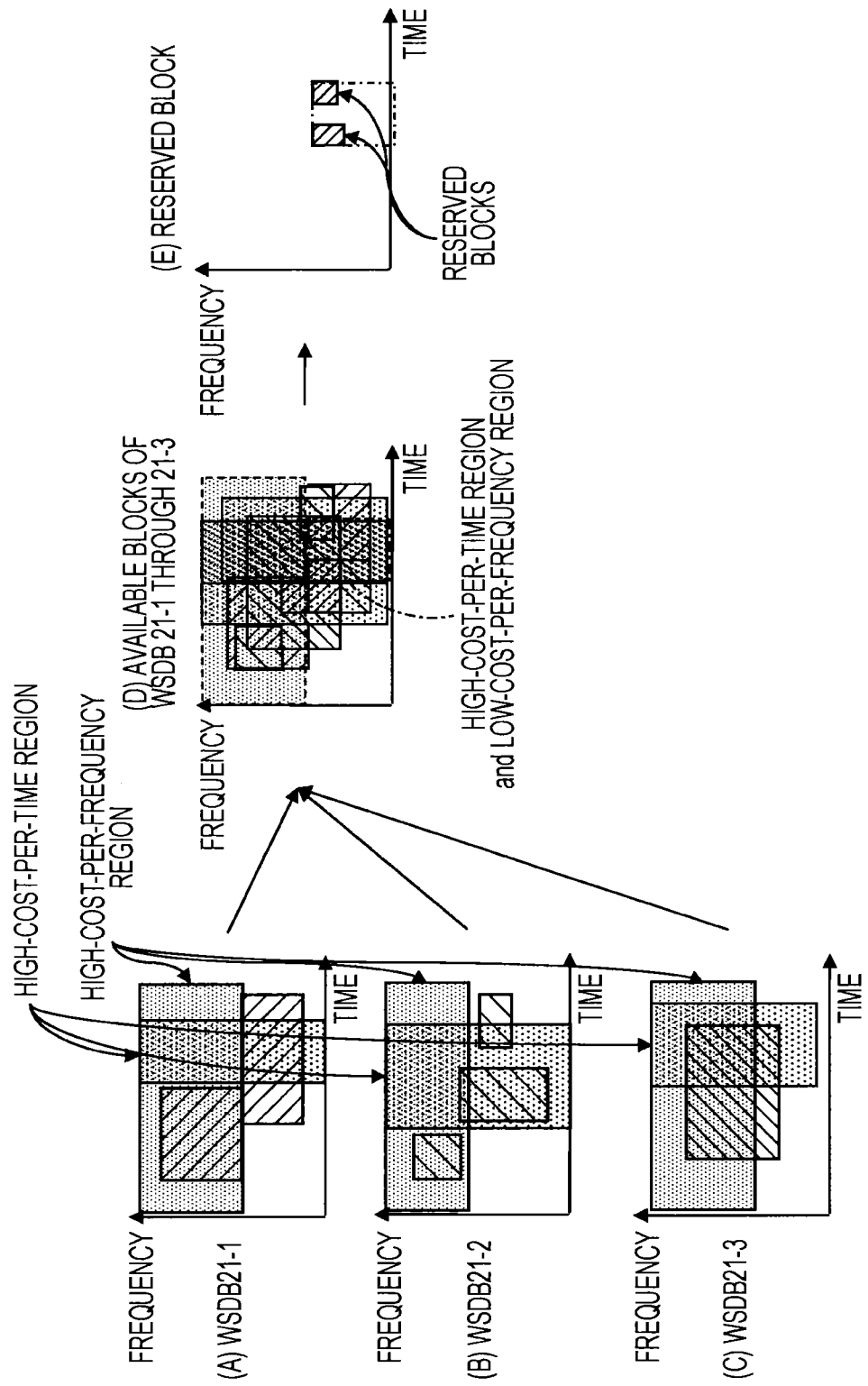
FIG. 12 is a diagram illustrating an evaluation method of a cost evaluation graph (setting high-cost-per-time and low-cost-per-frequency).

Also, a reserved block may be selected from the common available blocks, by combining the above-described time cost illustrated in FIG. 10 and the frequency cost illustrated in FIG. 11, in accordance with the combination of the time cost and frequency cost thereof. A case where these combinations are used is a case where the frequency cost is desired to be kept to a minimum while the time cost may be the maximum, for example.

For example, as illustrated in FIG. 12A through 12C, with the available blocks B1 through B3, the high-cost-per-time region and high-cost-per-frequency can be set to the graph representing each of the time and frequency on the plane.

With the plane illustrated in FIG. 12A through FIG. 12C represented on a plane in a superimposed manner, as illustrated in FIG. 12D, the high-cost-per-time and high-cost-per-frequency regions are further superimposed to the available blocks B1 through B3 represented in a superimposing manner. That is to say, of the common available blocks, with the common available block within the high-cost-per-time or high-cost-per-frequency region, the cost is expected to be high, while, with the common available block within the low-cost-per-time region or low-cost-per-frequency region, the cost is expected to be low.

For example, in the event that the cost parameter indicates the priority of the high-cost-per-time and the priority of the high-cost-per-frequency, the common available block which is within the high-cost-per-time region and in the high-cost-per-frequency region are selected as a reserved block, as illustrated in FIG. 12E.

Note that in FIG. 12E is illustrated the case where the high-cost-per-time region and the low-cost-per-frequency region have priority, however in the event that the cost parameter is indicating the priority of the high-cost-per-time region and the priority of the high-cost-per-frequency region, the common available block which is in the high-cost-per-time region and in the high-cost-per-frequency region is selected as a reserved block. Also, even in the event that the low-cost-per-time region and low-cost-per-frequency region have priority and in the event that the low-cost-per-time region and high-cost-per-frequency region have priority, the common available block within the region to have priority is selected as a reserved block.

As described above, with the distribution evaluation unit 122, evaluation is performed after weighting is performed by a parameter indicating whether either of the common available block belonging to either or both of the high-cost-per-time region or low-cost-per-time region, and high-cost-per-frequency region or low-cost-per-frequency region, whereby the reversed block is identified.

Note that, as described above, the cost parameter is set beforehand by content providers such as content production companies or the like, as evaluation reference information.

Accordingly, the content providers can set their content distribution conditions (distribution time slot and distribution frequency band) from the point of view of whether they want more viewers to view, or if they want the content to be distributed with a higher bit rate, taking into consideration of their own estimated cost, for example. As a result, the content providers can distribute a desired content with the best distribution conditions, within their own estimated cost.

Returning to the flowchart in FIG. 8, when the processing in step S105 has ended, the processing further returns to the flowchart in FIG. 6 and the processing in step S23 and later is executed.

In step S24, the WSDB reference unit 123 notifies the reserved block identified by the distribution evaluation processing to each of the WSDBs 21-1 through 21-3 via the transmission path 2.

In step S32, the DB management unit 212 of the WSDB 21-1 registers the reserved block notified from the broadcast resource management server 12 to the WSDB 213. In the same way as with the WSDBs 21-2 and 21-3, the notified reserved block is registered to the WSDB 213, respectively.

Thus, with each WSDB 21, the time slot and frequency band corresponding to the reserved block are secured for distributing of the content by the broadcast server 11, thereby preventing from being used for distribution of another content.

On the other hand, with the broadcast resource management unit 12, a distribution schedule is generated, based on the reserved block identified by the distribution evaluation processing, by the distribution schedule generating unit 126 (step S25).

This distribution schedule is distribution information of the content distributed by the distribution time slot and distribution frequency band allocated to the reserved block, serving as the file where the meta data is stored (manifest file), for example. For example, the title, genre, overview, purchasing price, and other such information relating to the content to be distributed, for each distribution time slot and distribution frequency band, is stored in the distribution schedule (distribution information) as meta data.

The generated distribution schedule is notified to the broadcast server 11 by the communication unit 121 while it is also notified to the TVBDs 31-1 through 31-M via the transmission path 2 by the distribution schedule notifying unit 127 (step S26).

When the distribution schedule is notified, with the broadcast server 11, scheduling of the distribution processing is executed by the control unit 110 (step S13). With this scheduling, based on the notified distribution schedule, when a distribution time slot arrives, a schedule to perform broadcasting on the content is made, using the distribution frequency band.

Figure 7:
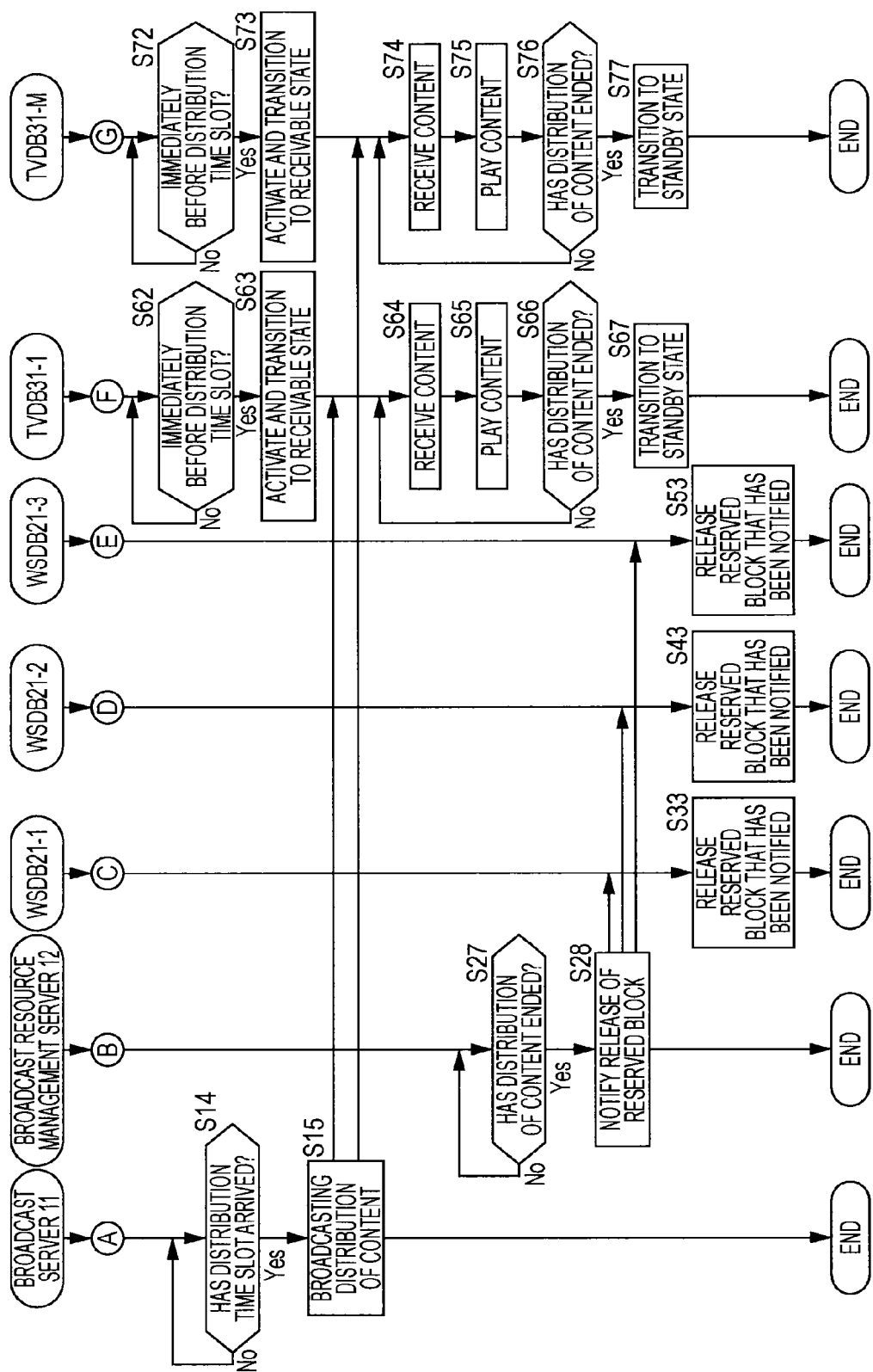
FIG. 7 is a flowchart illustrating content distribution processing.

The broadcast server 11 then stands by until determination is made by the control unit 110 that a distribution time slot has arrived ("Yes" in step S14 in FIG. 7).

On the other hand, with the TVBD 31-1, when the distribution schedule is notified, scheduling of the reception processing is executed by the control unit 310 (step S61). With this scheduling, based on the notified distribution schedule, when a distribution time slot arrives, a schedule where the desired content which is distributed from the broadcasting server 11 is in the receivable state, is made using the distribution frequency band.

Figure 13:
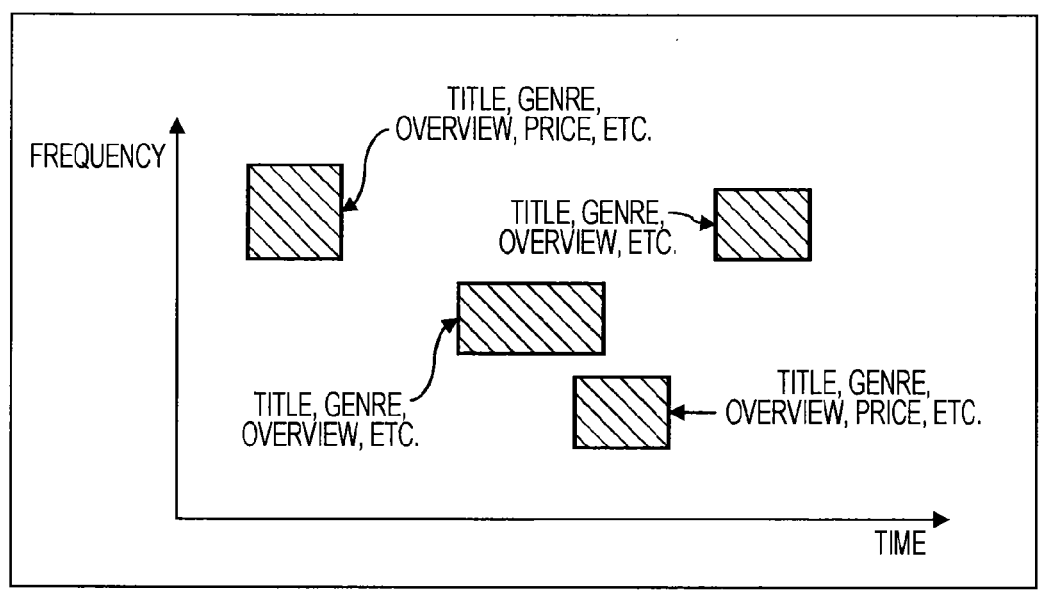
FIG. 13 is a diagram illustrating a screen example of selecting content.

For example, based on the meta data of the content included in the distribution schedule, as illustrated in FIG. 13, the control unit 310 displays the distribution schedule where information relating to the title, genre, overview, price, and other content each content where the distribution will be scheduled, is represented on the plane with time and frequency to the display unit 312. A user confirms the distribution schedule displayed on the display unit 312 and selects, of the content where distribution is scheduled, the desired content which he/she wants to view by operating the input unit 313.

Note that the distribution schedule in FIG. 13 is an example of screen displaying so as cause a user to select the content to be distributed, but display methods may be made such as an electronic program guide (EPG: Electronic Program Guide) usable with the TVBD 31, a radio/TV schedule in a newspaper, or the like.

Also, the control unit 310 executes processing to analogize the content which is to user's preference who is using the TVBD 31-1, of the content to be distributed, based on the user's preference information obtained by the preference information obtaining unit 316 and the analogized content may be taken as content which the user wants to view. In this case, the user does not have to select desired content. Also, as for the preference information, the above-described user's history of viewing and so forth is used, and content with genre and title according to the histories of viewing thereof is selected.

The TVBD 31-1 then stands by until determination is made that it is immediately before a distribution time slot (for example, few minutes before the distribution), by the control unit 310 ("Yes" in step S62 in FIG. 7).

Also, with the TVBD 31-2 through 31-M, in the same way as with the above-described TVBD 31-1, when the distribution schedule is notified, scheduling of the reception processing is executed. With this scheduling, a schedule is made to enable reception of the desired content which is distributed from the broadcast server 11 when a distribution time slot arrives, using the distribution frequency band. In the same way as with the TVBD 31-1, the TVBD 31-2 through 31-M then stands by until determination is made that it is immediately before the distribution time slot ("Yes" in step S72 in FIG. 7).

In the event that determination is made that it is immediately before the distribution time slot ("Yes" in step S62 and "Yes" in step S72), the TVBDs 31-1 through 31-M are activated by each control unit 310 and transitions to a state capable of receiving the desired content, from the standby state (steps S63 and S73). That is, we can also say that according to the distribution schedule, the TVBDs 31-1 through 31-M are in a state capable of being distributed to, from the perspective of the broadcast server 11 and broadcast resource management server 12 side.

On the other hand, with the broadcast server 11, in the event that determination is made that it is a distribution time slot ("Yes" in step s14), the processing proceeds to step S15. In step S15, the content distribution unit 113 then uses the distribution frequency band and performs broadcasting distribution on the content obtained by the content obtaining unit 111 to the TVBDs 31-1 through 31-M.

At this time, the TVBDs 31-1 through 31-M was activated and has been already in the receivable state, so the content to be distributed from the broadcast server 11 is received by the communication unit 311 (steps S64 and S74).

With the TVBD 31-1, the received content is played by the playing unit 314 and displayed to the display unit 312. Note that, as described above, the content to be distributed does not have to be played in real time and of the TVBD 31-2 through 31-M, with the TVBD 31-M, the received content is stored by the storage unit 315, for example.

Thus, the user who uses the TVBDs 31-1 through 31-M can view the desired content, or store and view it later.

The control unit 310 then determines whether or not the distribution processing of the content by the broadcast server 11 has ended and in the event that the distribution of the content has not ended ("No" in step S66 and "No" in S76) and the processing returns to the steps S64 and S74. The reception of the content and processing of playing or storage thereof is executed until the distribution of the content has ended.

On the other hand, in the event that the distribution of the content has ended ("Yes" in step S66 and "Yes" in S76), the control unit 310 transitions the state of the TVBD 31 to the standby state from the receivable state. Thus, with the TVBDs 31-1 through 31-M, receiving and playing or storing of the content is ended.

Also, with the broadcast resource management server 12, when the distribution of the content has ended ("Yes" in step S27), the processing proceeds to step S28. In step S28, the WSDB reference unit 123 notifies of release of the reserved block using the distribution of the content to each of the WSDBs 21-1 through 21-3 via the transmission path 2.

In step S33, the DB management unit 212 of the WSDB 21-1 releases the reserved block notified by the broadcast resource management server 12, which has been registered in the WSDB 213. In the same way as with the WSDB 21-2 and WSDB 21-3, the reserved block which has been registered in the WSDB 213 is released. Thus, in each WSDB 21, the time slot and frequency band corresponding to the reserved block are released, enabling to use for distribution of other content.

As described above, with the content distribution system 1, frequency usage state information managed by the WSDB 21 is obtained at the time of distributing the content, and the distribution time slot and distribution frequency band of the distributed content are evaluated based on the frequency usage state information. The distribution schedule is then notified to the TVBDs 31-1 through 31-M, which is within the region under management of the WSDB 21, and performs broadcasting on the content to the TVBDs 31-1 through 31-M which are in the receivable state by the distribution schedule.

Thus, when performing broadcasting distribution of a predetermined content, the TVBD 31 of the user who wants to view the content is activated in a sure manner, thereby improving the above-described capabilities of global broadcast receiving. As a result, the properties of the broadcasting distribution are fully utilized, thereby improving efficiency of information distribution such as content.

Also, at the time of evaluating the distribution time slot and distribution frequency band, evaluation is performed after weighting in accordance with the time slot and frequency band, so, from the content providers' side, the content can be distributed with the time slot and bit rate of the distribution to meet their cost which they can pay. Accordingly, improving of efficiency of the information distribution can be realized according to the distribution cost, thereby improving cost effectiveness of the content distribution.

<2. Second Embodiment>
[Another Configuration of Content Distribution System]

Figure 14:
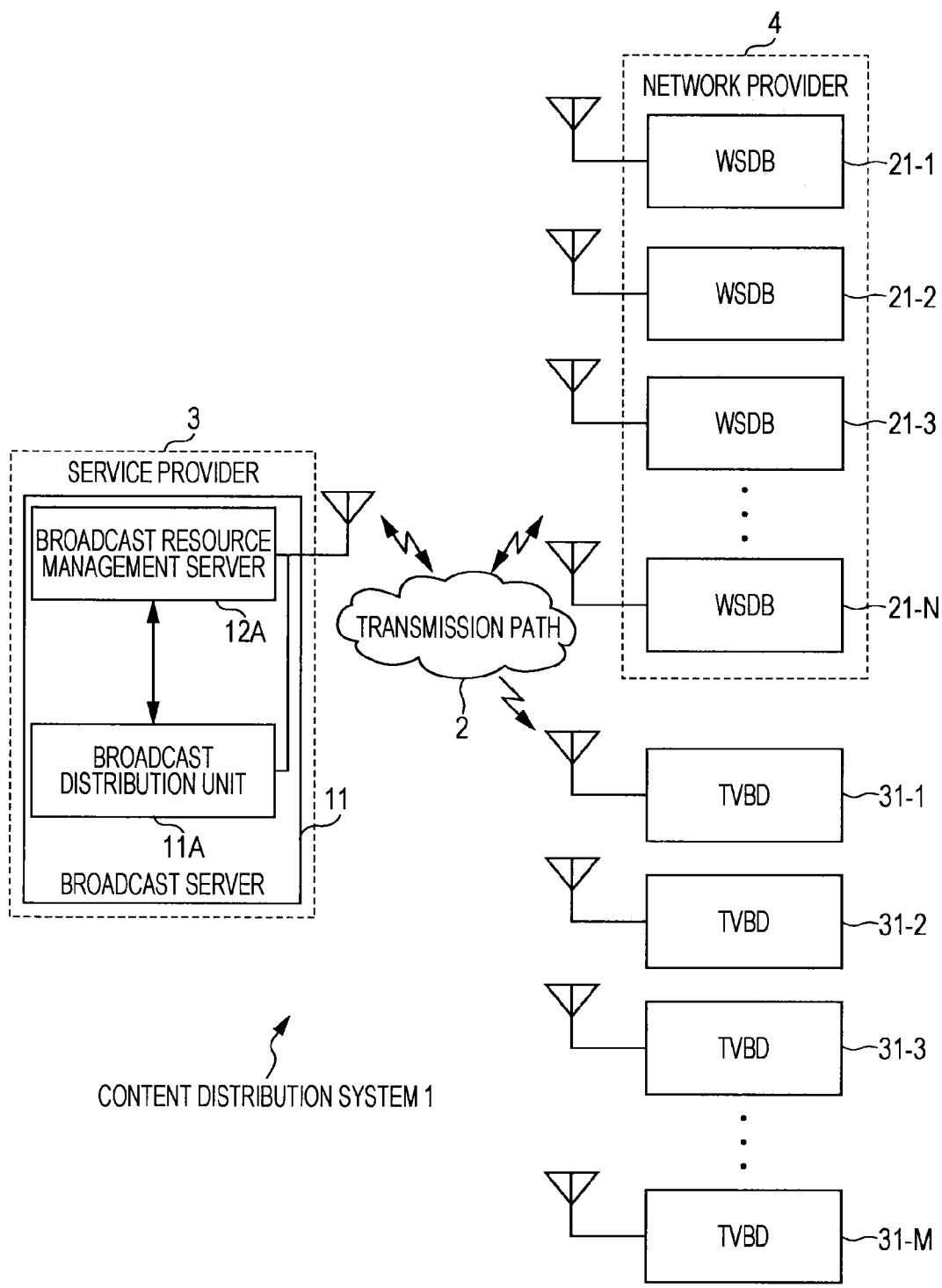
FIG. 14 is a diagram illustrating another configuration of an embodiment of the content distribution system according to the present invention.

FIG. 14 is a diagram illustrating another configuration of an embodiment of the content distribution system according to the present invention.

In FIG. 1, description has been made that the broadcast server 11 and broadcast resource management server 12 are each independent devices, however these devices can be conceived to be a single broadcast server 11, as illustrated in FIG. 14.

That is to say, the broadcast server 11 in FIG. 14 is a device made up of a broadcasting distributing unit 11A as one processing unit corresponding to the broadcasting serving 11 in FIG. 1 and a broadcast resource management server 12A as one processing unit corresponding to the broadcast resource management server 12. The broadcast server 11 in FIG. 14 is located within the equipment of the service provider 3.

The broadcasting distributing unit 11A is configured of the control unit 110 through content distribution unit 113 in FIG. 2. The operation of the control unit 110 through content distribution unit 113 in FIG. 2 is as described above.

The broadcast resource management server 12A is configured of the control unit 120 through distribution schedule notifying unit 127 in FIG. 3. The operation of the control unit 120 through distribution schedule notifying unit 127 in FIG. 3 is as described above.

The content distribution system 1 in FIG. 14 is thus configured.

<3. Third Embodiment>
[Another Configuration of Content Distribution System]

Figure 15:
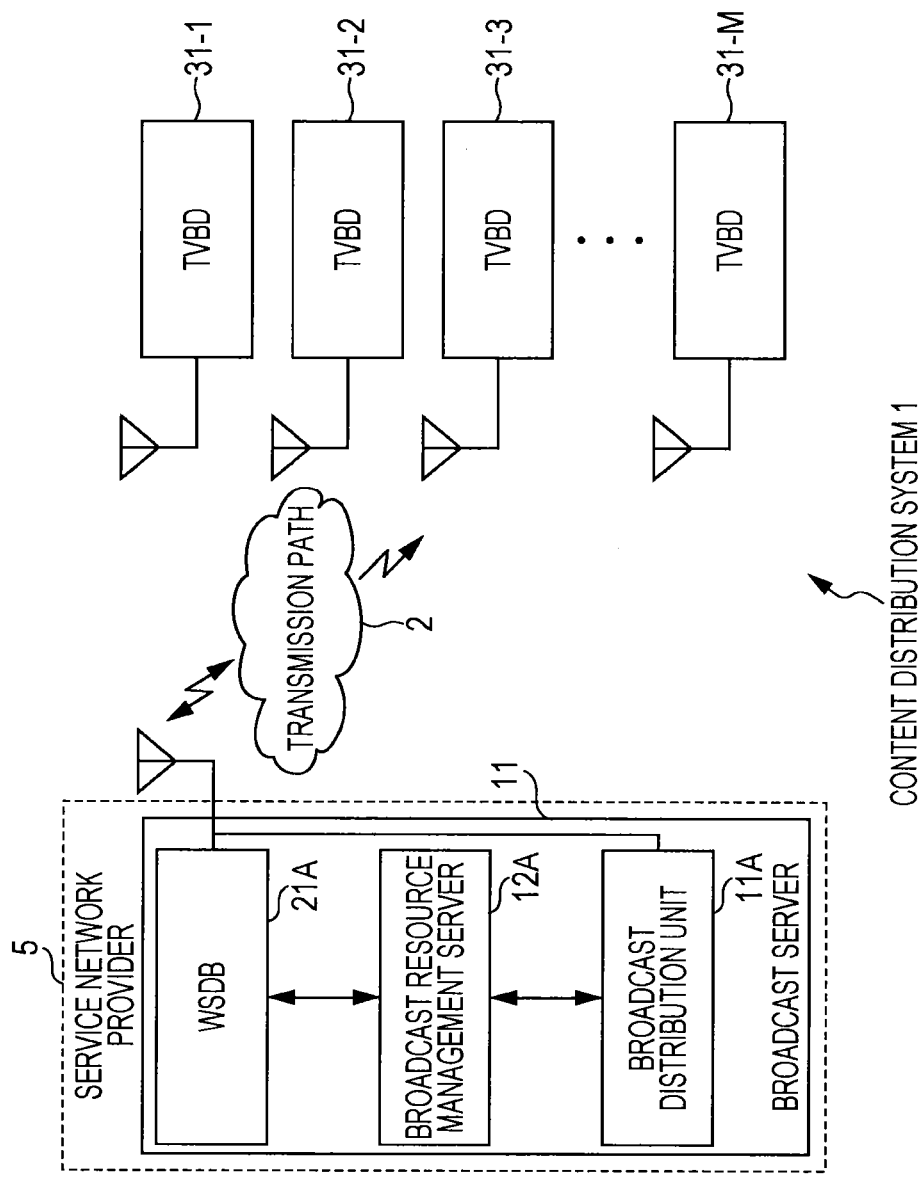
FIG. 15 is a diagram further illustrating another configuration of an embodiment of the content distribution system according to the present invention.

FIG. 15 is a diagram further illustrating another configuration of an embodiment of a content distribution system according to the present invention.

In FIG. 1, description has been made that the broadcast server 11, broadcast resource management unit 12, WSDBs 21-1 through 21-N are independent devices, however, these devices can be also conceived to be a single broadcast server 11, as illustrated in FIG. 15.

That is to say, the broadcast server 11 in FIG. 15 is a device made up of a WSDB 21A as one processing device corresponding to the WSDB 21, other than the above-described broadcasting distributing unit 11A and broadcast resource management unit 12A in FIG. 14. The broadcast server 11 in FIG. 15 is located within the equipment of the service network provider 5. The service network provider 5 is a provider which provides both content distribution services and frequency usage state information.

The WSDB 21A is configured of the control unit 210 through WSDB 213 in FIG. 4. The operation of the control unit 210 through WSDB 213 in FIG. 4 is as described above.

The content distribution system 1 in FIG. 15 is thus configured.

<4. Modification>

With the above-described description, description has been made regarding an example in which weighting is performed with the two-stage cost of "low" and "high" along with the time and frequency, however, it is not limited to the above-described two stages, and weighting may be performed with the cost of three stages or more, such as three stages of "low", "middle", and "high", four stages of "level 1", "level 2", "level 3", and "level 4", for example.

Also, the distribution of the content according to the broadcast server 11 is not limited to broadcasting such as broadcasting like TV broadcasting, needless to say, but also other communication methods may distribute the content. Note that, here, the term communication may be communication where wireless communication and cable communication coexist, where in some sections wireless communication is performed, and in other sections cable communication is performed, not to mention wireless communication and cable communication. Further, communication from one device to another device may be performed by cable communication and communication from another device to the one device may be performed by wireless communication.

[Description of Computer in which Present Invention has been Applied]

The above-described series of processing may be performed by hardware, or may be performed by software. In the event that the series of processing is performed by software, the program making up the software is installed in a general-purpose computer or the like.

Figure 16:
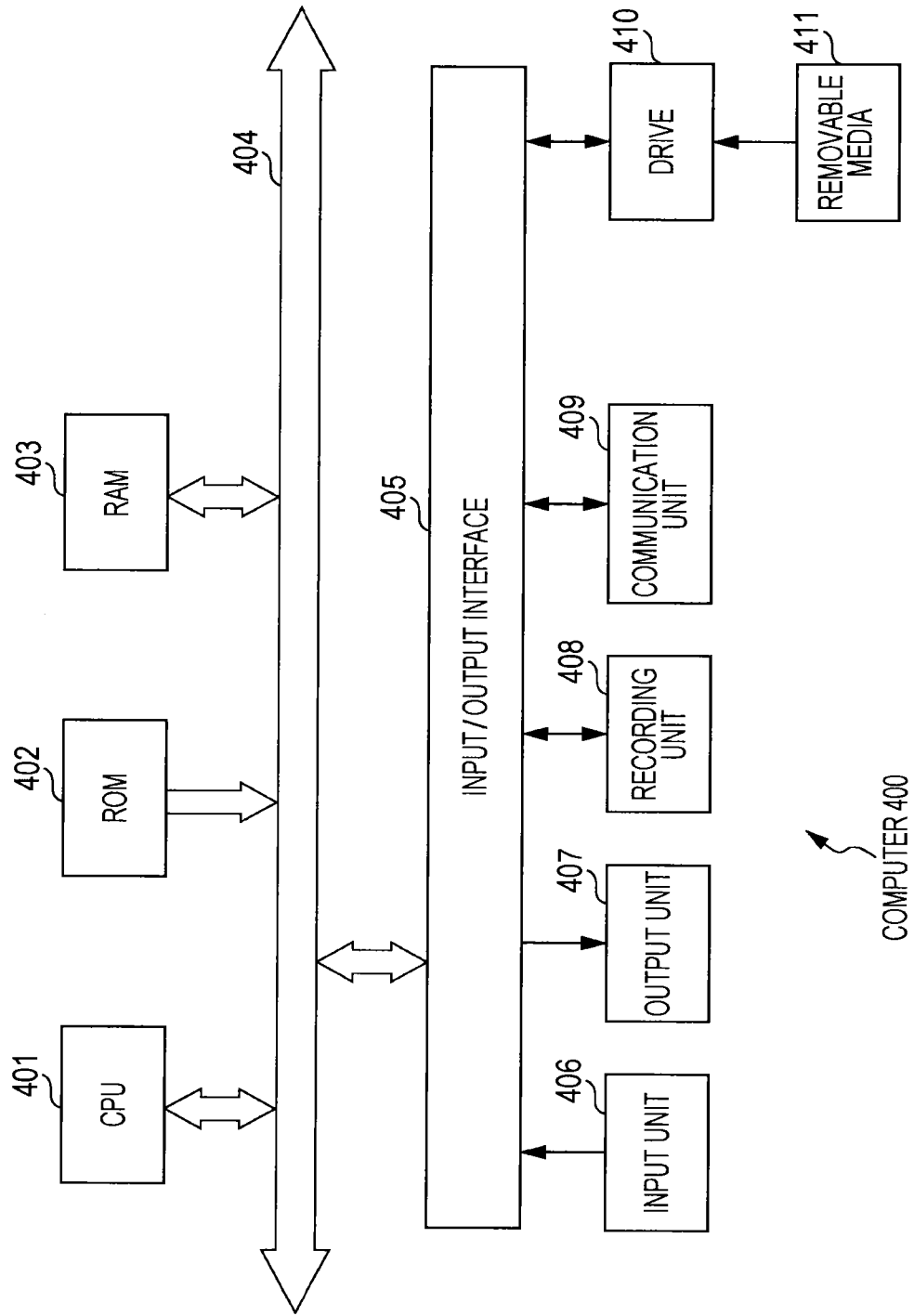
FIG. 16 is a diagram illustrating a configuration example of a computer.

Accordingly, FIG. 16 illustrates a configuration example of an embodiment of the computer where the program executing the above-described series of processing is installed.

The program can be recorded beforehand in a recording unit 408 such as a hard disk or ROM (Read Only Memory) 402 built in the computer 400.

Alternatively, the program can be temporarily or permanently stored (recorded) in a removable recording medium 411 such as a flexible disc, CD-ROM (Compact Disc Read Only Memory), MO (Magneto Optical) disc, DVD (Digital Versatile Disc), Magnetic Disc, semiconductor memory, or the like. Such removable recording medium 411 can be provided as so-called packaged software.

Note that, besides being installed from the above-described removable recording medium 411 to the computer 400, the program may be transferred by wireless to the computer 400 via an artificial satellite for digital satellite broadcasting from a download site, or transferred by cable to the computer 400 via a network such as LAN (Local Area Network) and the Internet, and at the computer 400, the program transferred thus can be received at a communication unit 409 and installed in the recording unit 408.

The computer 400 has a CPU (Central Processing Unit) 401 built in. An input/output interface 405 is connected via a bus 404 to the CPU 401, and when an instruction is input by a input unit 406 configured of a keyboard, a mouse, a microphone, or the like, being operated by the user via the input/ output interface 405, the CPU 401 executes the program stored in the ROM 402 accordingly. Alternatively, the CPU 401 loads a program stored in a recording unit 408, a program transferred from a satellite or a network, received at the communication unit 409, and installed in the recording unit 408, or a program read out from the removable recording medium 411 mounted to a drive 410 and installed in the recording unit 408, to RAM (Random Access Memory) 403, and executed. Thus, the CPU 401 performs processing following the above-described flowchart and processing performed by the configuration of the above-described block diagram. The CPU 401 then outputs the processing result from the output unit 407 configured of an LCD (Liquid Crystal Display), speaker, and so forth, or transmits from the communication unit 409, and further records in the recording unit 408, or the like for example, according to need, via the input/output interface 405.

Here, according to the present specification, processing steps describing the program to cause the computer to perform various types of processing do not necessarily have to be processed in the time sequence following the order described as a flowchart, and also include processing executed in a parallel or individual manner (for example, parallel processing or processing by object).

Also, the program may be processed by a single computer, or may be performed by distributed processing by multiple computers. Further, the program may be transferred to a remote computer and executed.

Note that, according to the present specification, the term system represents the entirety of devices configured of multiple devices.

Further, the embodiment of the present invention is not restricted to the above-described embodiments, and that various modifications may be made without departing from the scope of the essence of the present invention.

REFERENCE SIGNS LIST 1 content distribution system
2 transmission path
11 broadcast server
11A broadcast distribution unit
12 broadcast resource management server
12A broadcast resource management unit
21, 21A, 21-1 through 21-N WSDB
31, 31-1 through 31-M TVBD
110 control unit
111 content obtaining unit
112 communication unit
113 content distribution unit
120 control unit
121 communication unit
122 distribution evaluation unit
123 WSDB reference unit
124 frequency usage state information unit
125 evaluation reference information obtaining unit
126 distribution schedule generating unit
127 distribution schedule notifying unit
210 control unit
211 communication unit
212 DB management unit
213 WSDB
310 control unit
311 communication unit
312 display unit
313 input unit
314 playing unit
315 storage unit
316 preference information obtaining unit
400 computer
401 CPU

The invention claimed is:

1. An information distribution device, comprising:
circuitry to
    obtain content to be distributed;
    obtain evaluation reference information including monetary cost parameters relating to a plurality of time slots and a plurality of frequency bands in a predetermined area;
    obtain frequency usage state information relating to a usage state of a frequency band for each time slot in the predetermined area;
    evaluate a distribution time slot to distribute the obtained content and a distribution frequency band to be used for the distribution, based on the obtained frequency usage state information and the obtained evaluation reference information, by generating a cost evaluation graph weighted by the evaluation reference information, evaluating the generated cost evaluation graph and identifying from common available blocks a reserved block for the distribution time slot and the distribution frequency band;
    notify the distribution information for the content to be distributed using the distribution frequency band for the distribution time slot, as to a plurality of terminal devices within the predetermined area; and
    use, when the distribution time slot arrives, the distribution frequency band to distribute the obtained content to the plurality of terminal devices in a state of being distributed to in accordance with the distribution information.

2. The information distribution device according to claim 1, wherein the evaluation reference information is a reference for evaluation of a monetary cost of a time slot in which more viewers is expected, and for evaluation of a monetary cost of a frequency band in which a higher distribution bit rate of the content is expected.

3. The information distribution device according to claim 1, wherein the evaluation reference information is a reference for evaluation of a monetary cost of a time slot in which more viewers is expected.

4. The information distribution device according to claim 1, wherein the evaluation reference information is a reference for evaluation of a monetary cost of a frequency band where in which a distribution bit rate of the content is expected.

5. The information distribution device according to claim 1, wherein the circuitry further obtains the frequency usage state information of the predetermined area from an information management device that manages the frequency usage state information of the predetermined area.

6. The information distribution device according to claim 1, wherein the circuitry further obtains the evaluation reference information at a same time as the content to be distributed.

7. The information distribution device according to claim 1, wherein the circuitry further
    compares the monetary cost parameters for each of the plurality of time slots and the plurality of frequency bands, and
    determines a priority of a particular time slot according to its respective monetary cost parameter and the comparison of the monetary cost parameters for each of the plurality of time slots and the plurality of frequency bands.

8. The information distribution device according to claim 7, wherein the circuitry further determines
a high priority for the particular time slot when the monetary cost parameter for the particular time slot indicates a low cost, and
a low priority for the particular time slot when the monetary cost parameter for the particular time slot indicates a high cost.

9. The information distribution device according to claim 7, wherein the circuitry further determines
a high priority for the particular time slot when the monetary cost parameter for the particular time slot indicates a low cost per bit rate, and
a low priority for the particular time slot when the monetary cost parameter for the particular time slot indicates a high cost per bit rate.

10. An information distribution method, comprising:
obtaining content to be distributed;
obtaining evaluation reference information including monetary cost parameters relating to a plurality of time slots and a plurality of frequency bands in a predetermined area;
obtaining frequency usage state information relating to an usage state of a frequency band for each time slot in the predetermined area;
evaluating, by circuitry, a distribution time slot to distribute the obtained content and a distribution frequency band to use to the distribution, based on the obtained frequency usage state information and the obtained evaluation reference information, by generating a cost evaluation graph weighted by the evaluation reference information, evaluating the generated cost evaluation graph and identifying from common available blocks a reserved block for the distribution time slot and the distribution frequency band;
notifying distribution information for the content to be distributed, using the distribution frequency band for the distribution time slot, as to a plurality of terminal devices within the predetermined area; and
distributing, when the distribution time slot arrives, the obtained content, to the plurality of terminal devices in a state of being distributed to in accordance with the distribution information, using the distribution frequency band.

11. The information distribution method according to claim 10, wherein the evaluation reference information is a reference for evaluation of a monetary cost of a time slot in which more viewers is expected, and for evaluation of a monetary cost of a frequency band in which a higher distribution bit rate of the content is expected.

12. The information distribution method according to claim 10, wherein the evaluation reference information is a reference for evaluation of a monetary cost of a time slot in which more viewers is expected.

13. The information distribution method according to claim 10, wherein the evaluation reference information is a reference for evaluation of a monetary cost of a frequency band where in which a distribution bit rate of the content is expected.

14. The information distribution method according to claim 10, further comprising:
obtaining the frequency usage state information of the predetermined area from an information management device that manages the frequency usage state information of the predetermined area.

15. An information distribution system, comprising:
an information distribution device, an information management device, and a plurality of terminal devices;
the information distribution device including circuitry to
obtain content to be distributed,
obtain evaluation reference information including monetary cost parameters relating to a plurality of time slots and a plurality of frequency bands in a predetermined area,
obtain frequency usage state information, from the information management device managing frequency usage state information relating to usage state of a frequency band for each time slot in the predetermined area,
evaluate a distribution time slot to distribute the obtained content and a distribution frequency band to be used for the distribution, based on the obtained frequency usage state information and the obtained evaluation reference information, by generating a cost evaluation graph weighted by the evaluation reference information, evaluating the generated cost evaluation graph and identifying from common available blocks a reserved block for the distribution time slot and the distribution frequency band, and
notify the distribution information for the content to be distributed, using the distribution frequency band for the distribution time slot, as to the plurality of terminal devices within the predetermined area;
each of the terminal devices including circuitry to control the content to be distributed, when the distribution time slot arrives, using the distribution frequency band in a receivable state for the distribution time slot, based on the distribution information notified from the information distribution device; and
the information distribution device including circuitry to distribute the obtained content, using the distribution frequency band, to the plurality of terminal devices in a state of being distributed to in accordance with the distribution information, when the distribution time slot arrives, wherein
each of the terminal devices receives the content distributed from the information distribution device.

* * * * *